(12) United States Patent
Mann et al.

(10) Patent No.: US 12,131,274 B2
(45) Date of Patent: Oct. 29, 2024

(54) METHODS AND SYSTEMS FOR SERVICE REQUEST MANAGEMENT

(71) Applicants: Atlassian Pty Ltd., Sydney (AU); Atlassian Inc., San Francisco, CA (US)

(72) Inventors: Christopher Mann, Sydney (AU); Benjamin Wong, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/362,860

(22) Filed: Jun. 29, 2021

(65) Prior Publication Data
US 2022/0414565 A1     Dec. 29, 2022

(51) Int. Cl.
| | |
|---|---|
| *G06F 16/24* | (2019.01) |
| *G06F 3/0482* | (2013.01) |
| *G06F 3/0483* | (2013.01) |
| *G06F 3/04842* | (2022.01) |
| *G06F 16/38* | (2019.01) |
| *G06N 5/02* | (2023.01) |
| *G06Q 10/0631* | (2023.01) |

(52) U.S. Cl.
CPC ..... *G06Q 10/06311* (2013.01); *G06F 3/0482* (2013.01); *G06F 3/0483* (2013.01); *G06F 3/04842* (2013.01); *G06F 16/24* (2019.01); *G06F 16/38* (2019.01); *G06N 5/02* (2013.01)

(58) Field of Classification Search
CPC ............... G06Q 10/06311; G06F 16/24; G06F 3/0482; G06F 3/0483; G06F 3/04842; G06F 16/38; G06N 5/02
See application file for complete search history.

(56) References Cited

U.S. PATENT DOCUMENTS

| | | | | |
|---|---|---|---|---|
| 9,438,599 | B1 * | 9/2016 | Yuhan | H04L 63/10 |
| 10,613,525 | B1 * | 4/2020 | Kapoor | G06F 11/3476 |
| 2006/0247964 | A1 * | 11/2006 | Baturytski | G06Q 10/06 |
| | | | | 705/7.26 |
| 2007/0204326 | A1 * | 8/2007 | Bocking | H04W 8/245 |
| | | | | 726/1 |
| 2008/0127040 | A1 * | 5/2008 | Barcellona | G06F 8/10 |
| | | | | 717/101 |

(Continued)

OTHER PUBLICATIONS

P. Kubiak and S. Rass, "An Overview of Data-Driven Techniques for IT-Service-Management," in IEEE Access, vol. 6, pp. 63664-63688, 2018, doi: 10.1109/ACCESS.2018.2875975. (Year: 2018).*

(Continued)

*Primary Examiner* — Crystol Stewart
(74) *Attorney, Agent, or Firm* — Brownstein Hyatt Farber Schreck, LLP

(57) ABSTRACT

Described herein is a computer implemented method comprising: receiving, at an information technology service management (ITSM) system, a Practice Action request, the Practice Action request referencing a Practice, the Practice providing one or more selectively enablable Capabilities to a project created in the ITSM system; the ITSM system querying an issues database associated with the project; the ITSM system receiving a result set of candidate issues in response to the query; and the ITSM system modifying one or more of the candidate requests using the referenced Practice.

16 Claims, 7 Drawing Sheets

(56) References Cited

U.S. PATENT DOCUMENTS

| | | | |
|---|---|---|---|
| 2009/0192839 A1* | 7/2009 | Ramamoorthy | G06Q 10/06 705/317 |
| 2011/0119193 A1* | 5/2011 | McLees | G06Q 10/067 705/348 |
| 2014/0115138 A1* | 4/2014 | Biles | H04L 41/0856 709/223 |
| 2015/0082281 A1* | 3/2015 | Koenig | G06F 11/3664 717/124 |
| 2016/0224910 A1* | 8/2016 | Deng | G06Q 30/016 |
| 2016/0275436 A1* | 9/2016 | Kurjanowicz | G06Q 10/06398 |
| 2018/0285433 A1* | 10/2018 | Pavon | G06F 16/258 |
| 2018/0321915 A1* | 11/2018 | Patino-Bueno | G06F 8/36 |
| 2019/0080289 A1* | 3/2019 | Kreitler | G06Q 10/0637 |
| 2020/0126017 A1* | 4/2020 | Damonte | G06F 8/20 |
| 2020/0252323 A1* | 8/2020 | Shammari | H04L 45/028 |
| 2021/0073653 A1* | 3/2021 | Maes | G06Q 10/0631 |
| 2022/0294686 A1* | 9/2022 | Triplet | H04L 41/0636 |
| 2022/0326987 A1* | 10/2022 | Mason | G06Q 10/06 |
| 2023/0132465 A1* | 5/2023 | Kumar | G06Q 10/063112 705/7.14 |

* cited by examiner

METHODS AND SYSTEMS FOR SERVICE REQUEST MANAGEMENT

TECHNICAL FIELD

Aspects of the present disclosure are directed to application software such as information technology service management systems, and in particular to systems and methods for managing service requests within such systems.

BACKGROUND

An issue tracking system (ITS) (such as Applicant's "Jira"® suite of products) is application software that can be used to manage a wide range of tasks and projects. In some cases, an information technology service management (ITSM) system (such as Applicant's Jira Service Management) is built on top of an ITS. Amongst other functions, an ITSM system allows an organization to build and operate an information technology (IT) service desk. Users of an ITSM system create "requests" or "issues" in the ITSM system in the course of providing services to service users by way of the service desk. In this context, service users are typically the organisation's employees and/or customers who are seeking assistance through the service desk. Once created, the ITSM applies various actions to a request, both automatically and in response to user inputs.

Background information described in this specification is background information known to the inventors. Reference to this information as background information is not an acknowledgment or suggestion that this background information is prior art or is common general knowledge to a person of ordinary skill in the art.

SUMMARY

Example embodiments described herein are directed to a computer implemented method comprising: receiving, at an information technology service management (ITSM) system, a Practice Action request, the Practice Action request referencing a Practice, the Practice providing one or more selectively enablable Capabilities to a project created in the ITSM system; the ITSM system querying an issues database associated with the project; the ITSM system receiving a result set of candidate issues in response to the query; and the ITSM system modifying one or more of the candidate requests using the referenced Practice.

Some example embodiments described herein are directed to an information technology service management (ITSM) system comprising: a processing unit; and a non-transitory computer-readable storage medium storing sequences of instructions, which when executed by the processing unit, cause the processing unit to: receive a Practice Action request, the Practice Action request referencing a Practice, the Practice providing one or more selectively enablable Capabilities to a project created in the ITSM system; query an issues database associated with the project; receive a result set of candidate issues in response to the query; and modify one or more of the candidate issues using the referenced Practice.

Some example embodiments described herein are directed to a non-transitory storage medium storing instructions executable by a processing unit of an ITSM system to cause the processing unit to: receive a Practice Action request, the Practice Action request referencing a Practice, the Practice providing one or more selectively enablable Capabilities to a project created in the ITSM system; query an issues database associated with the project; receive a result set of candidate issues in response to the query; and modify one or more of the candidate issues using the referenced Practice.

Figure 1:
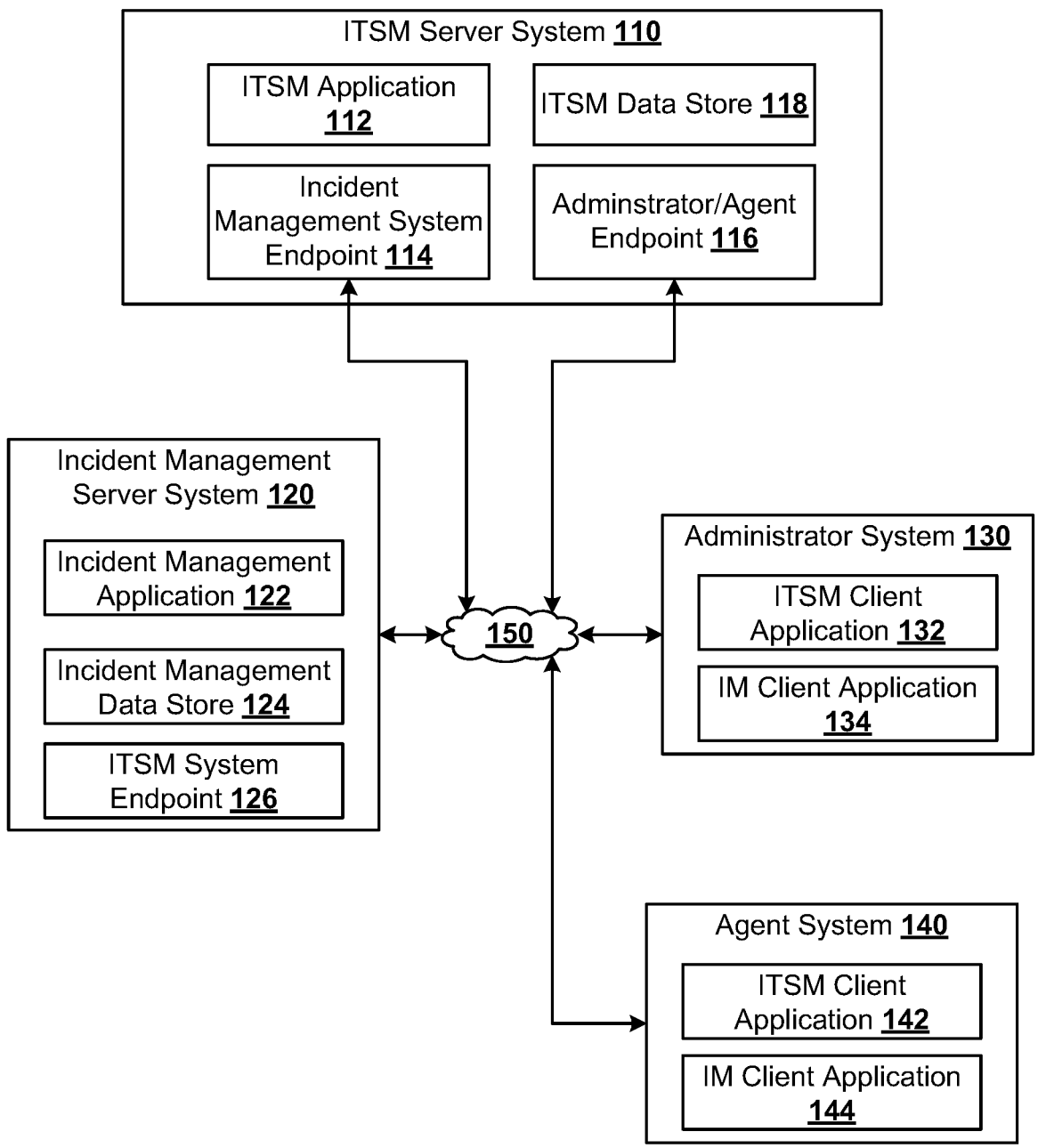
FIG. 1 is a diagram depicting a networked environment in which various features of the present disclosure may be implemented.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Modern ITSM systems include functionality that allows organisations to respond to a wide variety of requests beyond IT service requests. For example, in addition to IT Support (for both development and operations), Applicant's Jira Service Management includes template service desk projects for Human Resources, Accounting and Finance, Facilities, and Infrastructure Support. Jira Service Management can also be configured to create service desk projects that are tailored to a service team's specific operations and workflows.

However, with this expansion of ITSM systems to new domains, a new internal structure may be required, either for the ITSM system itself, and/or for the Issue Tracking Systems on which the ITSM system is based. The present disclosure aims to provide such a structure.

FIG. 1 illustrates an example environment 100 in which embodiments and features of the present disclosure are implemented. Example environment 100 includes a communications network 150 which interconnects an ITSM Server System 110, an Incident Management Server System 120, an Administrator System 130 and an Agent System 140.

ITSM Server System 110 hosts an ITSM Application 112, such as Applicant's Jira Service Management. ITS Server System 110 also hosts an Incident Management System Endpoint 114 and an Administrator/Agent Endpoint 116. Administrator/Agent Endpoint 116 serves as a communication endpoint into the ITSM Server System 110 for the Administrator System 130 and Agent System 140. Although illustrated as a single communications endpoint (namely Administrator/Agent Endpoint 116), the ITSM Server System 110 could also provide a separate communications endpoint for the Administrator System 130 and Agent System 140.

ITSM Server System 110 further hosts an ITSM Data Store 118, on and from which the ITSM Application 112 stores and retrieves pertinent data (described in further detail below).

Generally speaking, ITSM Server System 110 is a scalable system including multiple instances of the ITSM Application 112 distributed across distinct server nodes, each connecting to a shared ITSM Data Store 118 that resides on its own server (e.g. a shared file server). Depending on demand from agents (and/or other performance requirements), ITSM Server System 110 nodes can be provisioned/de-provisioned on demand to increase/decrease the number of servers offered by the ITSM Server System 110. Each ITSM Application 112 may run on a separate server computer system within ITSM Server System 110 and include one or more application programs, libraries, APIs or other software that implement server-side functionality. Similarly, ITSM data store 118 may run on the same server computer system as ITSM Application 112, or may run on its own dedicated system (accessible to ITSM Application (s) 112 either directly or via a communications network).

ITSM Application 112 (and/or other applications running in the environment 100) can be implemented as a monolithic application. Alternatively ITSM Application 112 can be implemented as a collection of independent and autonomous application services (e.g. microservices). In this case, the constituent application services of ITSM Application 112 communicate amongst themselves, with other server instances (such as the Administrator/Agent Endpoint 116), and/or with Administrator Systems 130 and Agent Systems 140, via defined interfaces such as web APIs.

Incident Management Server System 120 typically comprises equivalent server hardware and software infrastructure as ITSM Server System 110. Incident Management Server System 120 hosts an Incident Management Application 122, which in the illustrated embodiment is Applicant's "Opsgenie" product. Incident Management Server System 120 further hosts an Incident Management Data Store 124, on and from which the Incident Management Application 122 stores and retrieves pertinent data (described in further detail below). Incident Management Server System 120 also hosts an ITSM System Endpoint 126 that serves as a communication endpoint for transmitting and receiving data to and from the ITSM Server System 110.

Incident Management Application 122 (for example Opsgenie) is a dedicated incident management platform that is integrated with monitoring systems (not shown) that monitor an organisation's hardware, software, services and infrastructure. Incident Management Application 122 receives alerts from such monitoring systems and processes the alerts, such as by applying categories thereto (typically based on importance and timing) and notifying, through a suitable communication channel, the appropriate personnel responsible for responding to the alert. The Incident Management Application 122 also processes received monitoring data into a more meaningful form for viewing and actioning by agents.

Incident Management Application 122 and ITSM Application 112 are bi-directionally integrated with each other by way of the ITSM System Endpoint 126 and Incident Management System Endpoint 114. Such integration allows the Incident Management Application 122 and ITSM Application 112 to receive data from each other and synchronise their respective Data Stores (namely ITSM Data Store 118 and Incident Management Data Store 124). Synchronisation between Incident Management Application 122 and ITSM Application 112 is especially important when both systems are used simultaneously for incident management. In this scenario, the systems must be synchronised so that when a user performs an action on an entity in one system (such as an alert in the Incident Management Application 122), a corresponding entity in the other system is updated (such as a request in the ITSM Application 112).

There are generally two categories of user of the ITSM Application 112, namely "agents" and "administrators". As discussed above, agents operate the service desks that are created in the ITSM Application 112 in order to resolve requests from service users. Agents utilise an Agent System 140 for this purpose, on which an ITSM Client Application 142 is installed. To resolve service user requests, amongst other actions, agents input data into the ITSM Client Application 142, which is communicated to the ITSM Application 112 over the Communications Network 150. The ITSM Client Application 142 is also responsible for storing such received data in ITSM Data Store 118. In addition, the ITSM Application 112 retrieves and processes data from ITSM Data Store 118, generates web documents (that include necessary scripts and event listeners) therefrom and communicates the web documents to the Agent System 140 for display thereon in the ITSM Client Application 142.

The ITSM Application 112 (running on ITSM Server System 110) and the ITSM Client Application 142 (running on Agent System 140) operate together to provide ITSM functionality. Operations described herein as "ITSM operations" or operations performed by the ITSM Application 112, may be performed by the ITSM Client Application 142 (operating on Agent System 140), the ITSM Application 112 (operating on ITSM Server System 110) or the ITSM Client Application 142 and ITSM Application 112 in cooperation. For example, ITSM operations involving the display of data involve displaying information on the Agent System 140 as controlled by the ITSM Client Application 142. The data displayed, however, may be generated by the ITSM Client Application 142 itself, or generated by the ITSM Application 112 and communicated to the Agent System 140 therefrom. As a further example, ITSM operations involving agent input involve the Agent System 140 receiving user input and passing that input to the ITSM Client Application 142. The information input may be processed by the ITSM Client Application 142 itself, or communicated by the ITSM Client Application 142 to the ITSM application 112 to be processed by the ITS application 112.

The Agent System 140 is a computer processing system with the ITSM Client Application 142 installed thereon. The Agent System 140 will also have other applications installed/running thereon, for example an operating system. The ITSM Client Application 142 is typically a web browser (such as Chrome, Safari, Internet Explorer, Firefox, or an alternative web browser) which communicates with the ITSM Server System 110 using http/https protocols. ITSM Client Application 142 may also be a dedicated application client that communicates with the ITSM Server System 110 using an appropriate protocol.

An Incident Management Client Application 144 is also installed on the Agent System 140. Agents utilise the Incident Management Client Application 144 to access the Incident Management Application 122 and respond to incidents defined therein. Although the ITSM Client Application 142 and Incident Management Client Application 144 are illustrated as separate applications, those skilled in the art will appreciate that ITSM and Incident Management client functionality could readily be provided in a single application. For example, when the client application is a web browser, the ITSM Client Application 142 and Incident Management Client Application 144 could execute in separate browser tabs.

The Agent System 140 may be any form of computer processing system. Typically, Agent System 140 is a personal computing device—e.g. a desktop computer, laptop computer, tablet computer, and in some instances a mobile phone. While a single Agent System 140 has been illustrated, an environment would typically include multiple Agent Systems 140 interacting with the ITSM Application 112. For example, when the ITSM Application 112 provides service management for a reasonably large organization, each agent working at the service desk accesses the ITSM Application 112 through their own Agent System 140.

Administrators are users (typically with higher system privileges) who perform administrative operations in the ITSM Application 112, such as to configure the ITSM Application 112 for a particular use case and environment. Administrators utilise an Agent System 140 for this purpose, on which an ITSM Client Application 132 and Incident Management Client Application 134 are installed. As discussed in further detail below, administrators configure the ITSM Application 112 through the ITSM Client Application 132. Configuration data that the administrator inputs into the ITSM Client Application 132 is communicated to the ITSM Application 112 over the Communications Network 150, where it is stored, by the ITSM Application 112, in ITSM Data Store 118. In the same way as when the ITSM Application 112 is in communication with an Agent System 140, the ITSM Application 112 communicates the results of data processing to the ITSM Client Application 132 as web documents that the ITSM Client Application 132 displays on the Administrator System 130.

The Administrator System 130 is a computer processing system, typically with similar software and hardware resources as the Agent System 140.

Amongst other responsibilities, administrators are responsible for defining the different types of work (or "issues") that service desk projects created within the ITSM Application 112 will manage. Generally speaking, issues types are defined globally for the ITSM Application 112. The administrator can then associate individual issue types, or schemes of issue types, with one or more service desk projects. ITSM Applications generally come with default issue types that are commonly used in service desk projects. For example, Applicant's Jira Service Management comes with the following default issue types:

Change—Requesting a change in the current IT profile;
IT help—Requesting help for an IT related problem;
Incident—Reporting an incident or IT service outage;
New feature—Requesting new capability or software feature;
Problem—Investigating and reporting the root cause of multiple incidents;
Service request—Requesting help from an internal or customer service team;
Service request with approval—Requesting help that requires a manager or board approval; and
Support—Requesting help for customer support issues.

Administrators are also responsible for creating service desk projects within the ITSM Application 112. At the project level, the different types of managed work units can be referred to as "requests". However, the terms "request" and "issue" are often used interchangeably.

Figure 2:
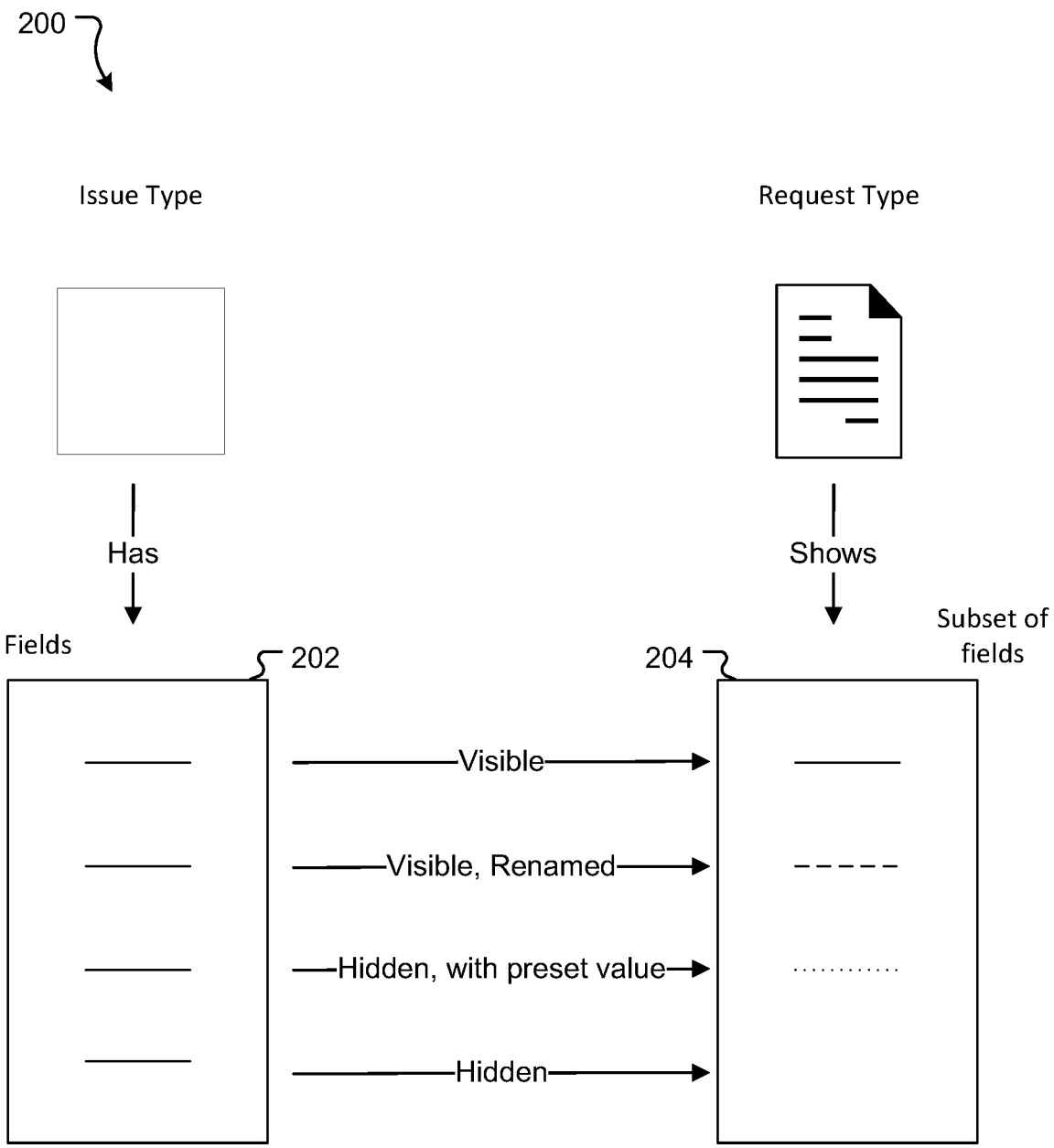
FIG. 2 is a diagram depicting the inheritance relationship between issue types and request types in ITSM systems according to the present disclosure.

A typical process 200 that an administrator performs to create a request type for a project is illustrated in FIG. 2. As shown in FIG. 2, an issue type 202 is a record data structure having a plurality of issue fields. A request type 204 is similarly a record data structure having a plurality of request fields. The administrator chooses the mapping between issue fields and request fields depending on the desired final form of the request type. In this regard, the administrator can create a request field that is identical to an issue field and is visible in the user interface of the ITSM Client Application 142. Alternatively, by operating the ITSM Client Application 132, the administrator can create a request field that is visible in the user interface of the ITSM Client Application 142, but is renamed from the corresponding issue field. In some cases, certain issue fields are not supported for use in the user interface of the ITSM Client Application 142. The administrator can include such fields in the request type, but is required (by a prompt from the ITSM Client Application 132) to set a preset value for the relevant request field. The administrator may also wish to hide certain issue fields in the user interface of the ITSM Client Application 142, but still make the fields available to the ITSM Application 112 for other purposes. For example, hidden fields can be used to collect analytics information about a request that can be analysed post-resolution in order to improve workflow efficiencies.

Figure 3:
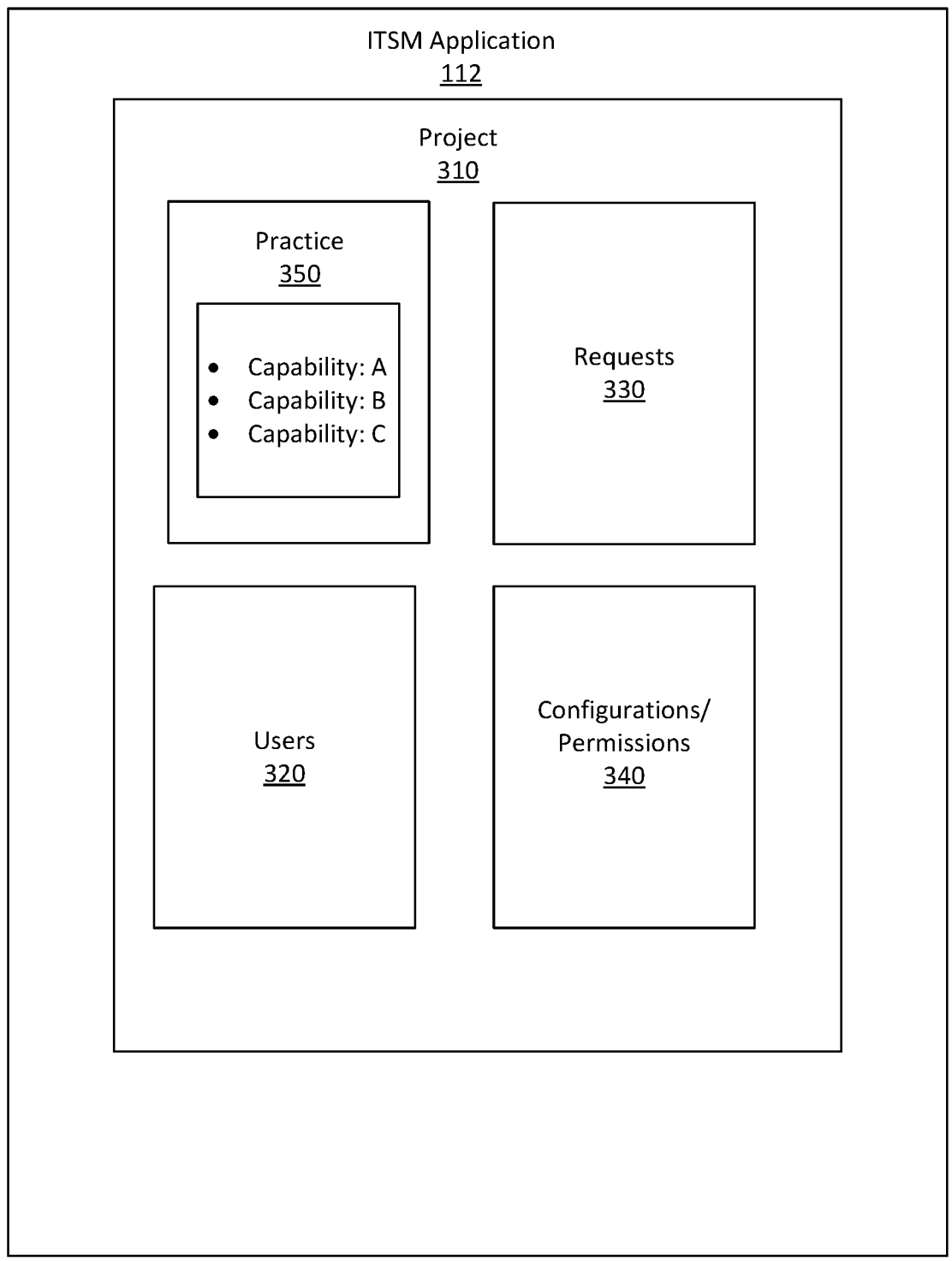
FIG. 3 is a diagram depicting a service desk project created using ITSM systems according to the present disclosure.

FIG. 3 is a schematic illustration of a service desk project 310 in accordance with the present disclosure. An administrator creates service desk project 310 within the ITSM Application 112 using the user interface of the ITSM Client Application 132. Service desk project 310 can be viewed as a container within the ITSM Application 112 that houses a set of Users 320, a set of Requests 330 (or issues), and the various project Configurations and Permissions 340.

According to the present disclosure, service desk project 310 also includes a Practice 350. Practice 350 is shown in FIG. 3 as a sub-container within service desk project 310. Practices can be defined globally throughout the ITSM Application 112 or locally within the context of a service desk project. Global Practices can be automatically included in projects when the project is created. As discussed in further detail below, both global and local Practices can be selectively enabled and disabled within a project. Although only a single Practice 350 is shown in FIG. 3, the service desk project 310 can include two or more Practices.

A Practice (such as Practice 350) encapsulates in software, a way of working for customers. A Practice provides one or more Capabilities, each of which is a representation of the availability of a piece of functionality within the ITSM Application 112. In other words, a Capability represents whether a piece of functionality is visible to an administrator or agent in the respective user interface of the ITSM Client Application 132 or 142. A functionality can take the form of a specific user experience (such as an issue view panel) or provide a number of separate (but sometimes related) functionalities. Capabilities are implemented programmatically in the ITSM Application 112. In the present embodiment, a Capability has no intrinsic state, but rather must be provided by a Practice.

A Practice can be considered as a type of Feature. A Feature is a collection of one or more functional units. Using the ITSM Client Application 132, an administrator can enable a Feature or Practice and thereby activate additional functionality in a service desk project. In this way, a Feature (like a Practice) provides one or more Capabilities. A Capability can be said to be "provided" when a Feature or Practice that provides the Capability is enabled in the service desk project.

Examples of Capabilities include Change Calendars, Change Windows, Issue View actions, Change Management Settings, Navigation Items and Deployment Gatings.

An example of a Practice is Change Management. A Change Management Practice provides the following Capabilities:

Services UI;
Change Calendar;
Deployment Change Management;
Best-practice request types; and
Change-Management-specific automation rules.

The same Capability can exist under more than one Feature. For example, Service Queue Category and Service Issue Category are both enabled by the Incident Management and Change Management Practices.

In the exemplified embodiment, Practices are implemented as a field of a Request Type. However, those skilled in the art will appreciate that other implementations are possible, such as by a field of an Issue Type.

Figure 4:
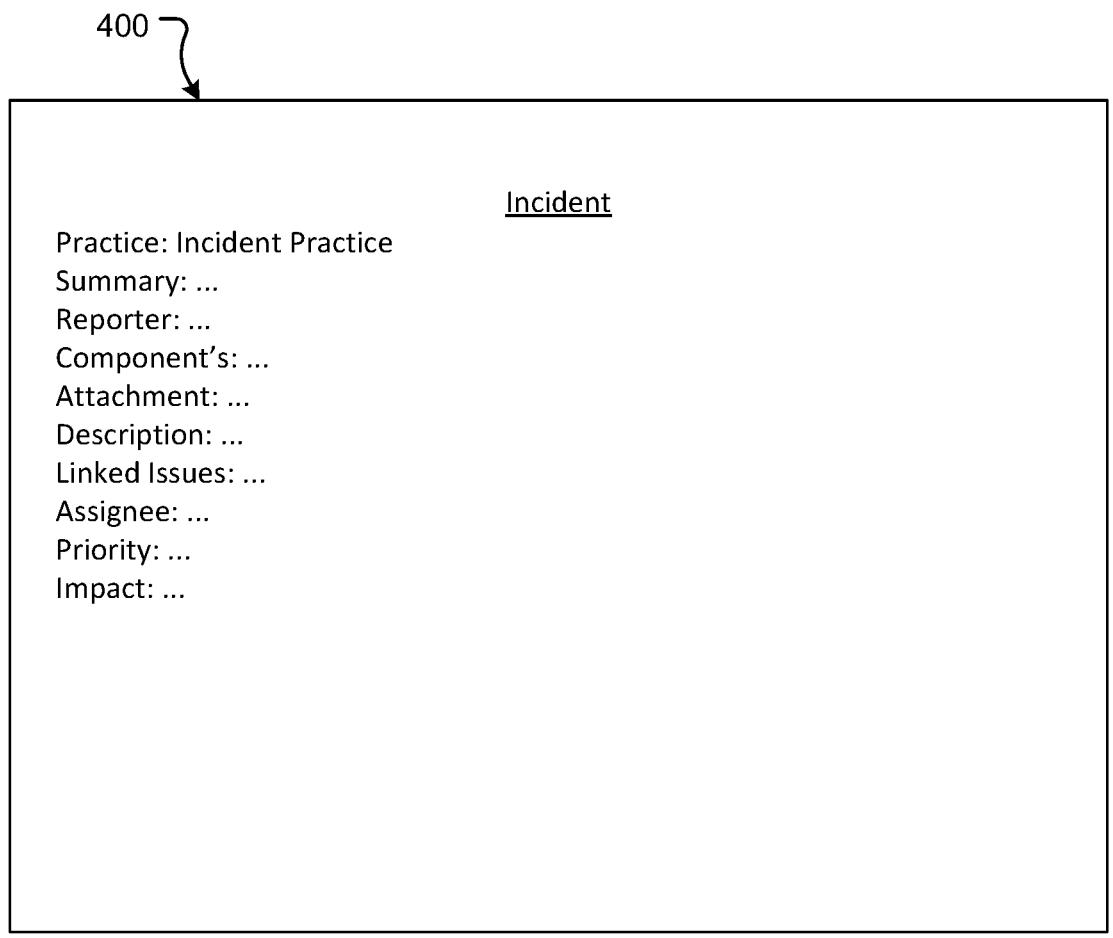
FIG. 4 is a diagram depicting a Request Type in accordance with the present disclosure.

An example Practice definition is illustrated in FIG. 4, which shows a Request Type 400. In the illustrated embodiment, Request Type 400 is an 'Incident', however those skilled in the art will appreciate that the teachings of the present disclosure can be applied to bespoke request types that administrators create.

Request Type 400 includes a plurality of request fields, one of which is a Practice Field. In the illustrated embodiment, the value of the Practice Field corresponds with the request type; in this case the value being "Incident Practice". However, the value of a Practice Field need not necessarily correspond with the relevant request type.

The value of the Practice Field is managed internally by the ITSM Application 112 and is typically hidden from agents.

The value of the Practice Field is an enumeration indicating the nature of the request type.

In a preferred embodiment, updates to the Practice Field are constrained through a validation process. One form of validation process involves the ITSM Application 112 only permitting the value of the Practice Field to be set if the proposed value reflects the Practice of the issue/request type to which the issue/request is associated. If there is no Practice associated with the issue (transitively or otherwise), the validation process only allows the value of the Practice Field to be unset.

In the exemplified embodiment, the Practice Field follows the Practice associated with the issue's issue type, and is hidden from contexts within the user interface of the ITSM Client Applications 132 and 142, even when mapped to a screen. The Practice Field does not need to be on a screen for the administrator to set the value. In this scenario, it is preferable for notifications to be disabled.

The other request fields in Request Type 400 (namely Summary, Reporter, Component's, Attachment, Description, Linked Issues, Assignee, Priority and Impact) are included for illustrative purposes only and thus do not include field values. Those skilled in the art will appreciate that request fields in an ITSM Application 112 can synchronise with the entity fields in an Incident Management Application 122. For example, in the case of JSM and Opsgenie, the JSM Summary issue field synchs to an Opsgenie "message" field, the JSM Description field synchs to an Opsgenie "description" field and a JSM Priority field synchs to an Opsgenie "priority" field. JSM request fields also synchronise with Opsgenie request fields.

Figure 5:
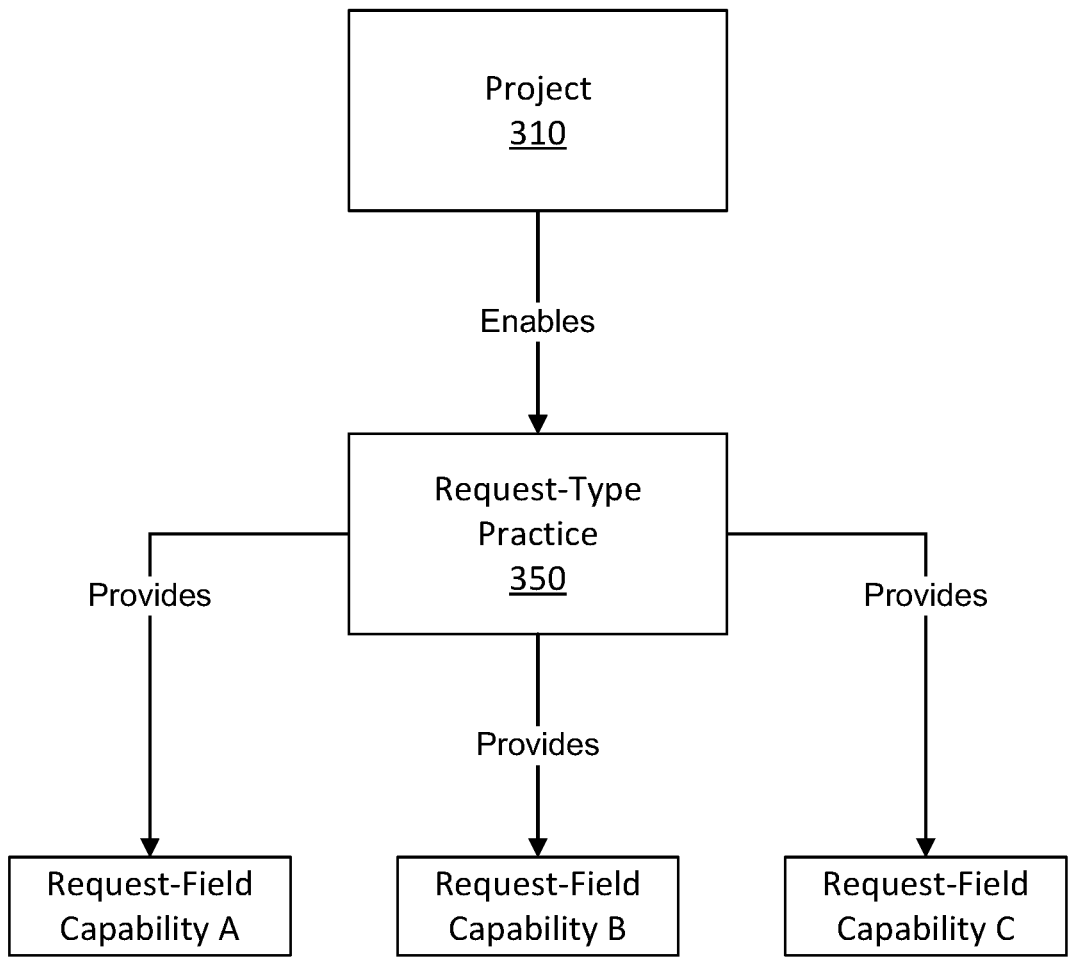
FIG. 5 is a diagram depicting a Practice in accordance with the present disclosure enabling Capabilities in a service desk project.

As described above, practices are automatically enabled in projects at the time of project creation. This is illustrated by reference to FIG. 5, which shows Project 310 enabling an Request-Type Practice 350 (in this case an "Incident Practice"). In turn, the Request-Type Practice 350 provides in the project, all of the Practice's constituent Capabilities. The provided Capabilities are illustrated schematically in FIGS. 3 and 5 as "Capability A", "Capability B" and "Capability C".

In an alternative embodiment of a Change Management Practice, the Practice provides the following Capabilities:

Deployment gating on issues of "change issue" category;
Change Calendar;
Change Issue category; and
Change Queue category.

When an administrator enables the Change Management Practice in a project (such as by manipulating a toggle switch in the user interface ITSM Client Application 132), the ITSM Application 112 automatically activates the Change Calendar. In turn, to function correctly, the ITSM Application 112 automatically configures the Change Calendar by locking a number of specific date fields.

As noted above, Capabilities represent whether a unit of functionality is exposed in the user interface of the ITSM Client Application 132 or 142. Capabilities offer a wide variety of functionalities when provided by a Practice or Feature. For example a Capability can modify the user interface of ITSM Client Application 132 or ITSM Client Application 142 to:

Add navigation items;
Enable panels in the issue view; and
Add configuration screens or capabilities inside existing configuration screens.

Preferably, administrators do not define Capabilities that are dependent on external user-generated configurations to function correctly. In addition, administrators should define Capabilities in such a way that feature-specific configuration is not deleted when the Capability is disabled.

As noted above, a Practice represents a way of working for customers, and there are two elements to a Practice:

Capabilities that are associated with the Practice and enabled/disabled depending on the state of the Capability associated with the Practice; and
Suggested "Best Practices", that take the form of suggested configurations (or "out of the box" OOTB configurations).

When Practices or Features are disabled, it is preferable that any derived or otherwise dependent configuration remain, possibly in a disabled state.

Different Practices, whether created by administrators or provided as a default, can include common Capabilities. For example, a Service Management Capability is both provided by an Incident Management Practice and a Change Management Practice. In this scenario, if one of the Practices is enabled, the Capability should be enabled. Therefore, if for example, an administrator disables Incident Management, but Change Management remains enabled, then the Service Queue Capability should remain enabled.

As part of a request being associated with a given Practice, that request is augmented with use-case specific functionality. Such functionality can extend beyond the ITSM Application 112 in which the Practice is defined. For example, a "System Incident" can be created in the Incident Management Application 122 to enable functionality in that application that also enables a corresponding practice in the ITSM Application 112.

The ITSM Application 112 provides functionality by which individual issues or requests are associated with a different Practice. In some cases, Practice association modifications need to be performed in bulk, such as when a customer's assets are first on-boarded into the ITSM Application 112, or when the ITSM Application is transitioned to a new ITSM Server System 110 (such as from an in-premises to a cloud environment). However, at least in theory, there can be an unbounded number of issues or requests associated with a given request type. Even reasonably modest-scaled enterprises may realistically number in excess of 100,000 issues for a single modification to the Practice associated with the request type.

In addition, actions in respect of Practices (i.e., Practice Actions) need to be applied in bulk in order to convert existing projects to the structures of the present disclosure. Periods with extensive volume of Practice changes being processed may bring about delays in reflecting new capabilities for an issue brought about by asynchronous processing. The lack of a scalable coordination-based approach to Practice change may result in the following consequences:

Extended periods during which the given issue or request has a Capability of a Practice other than that which is apparent. For example, the Practice may outwardly be an Incident, but is treated by the ITSM Application 112 as a Change Request.

Extended periods during which the issue or request has Capabilities of multiple Practices. For example, the issue or request may have Incident linking, but can also be used to approve pending Deployments.

Extended periods during which a given issue or request has no provided Capabilities. For example, an issue may not have an associated system incident.

The period over which these conditions prevail may feasibly extend into minutes and hours as tenants scale, depending on the number of issues being updated.

The present disclosure provides a scalable solution for performing Practice association modifications in bulk. In particular, issues or requests can be progressively migrated in a coordinated way after the administrator changes one or more of the Practices applying to the project.

In this regard, in a preferred form of the present disclosure, the value of the Practice Field is set by the ITSM Application 112 synchronously at time of issue creation. However, the process for updating the Practice Field is performed asynchronously.

Figure 6:
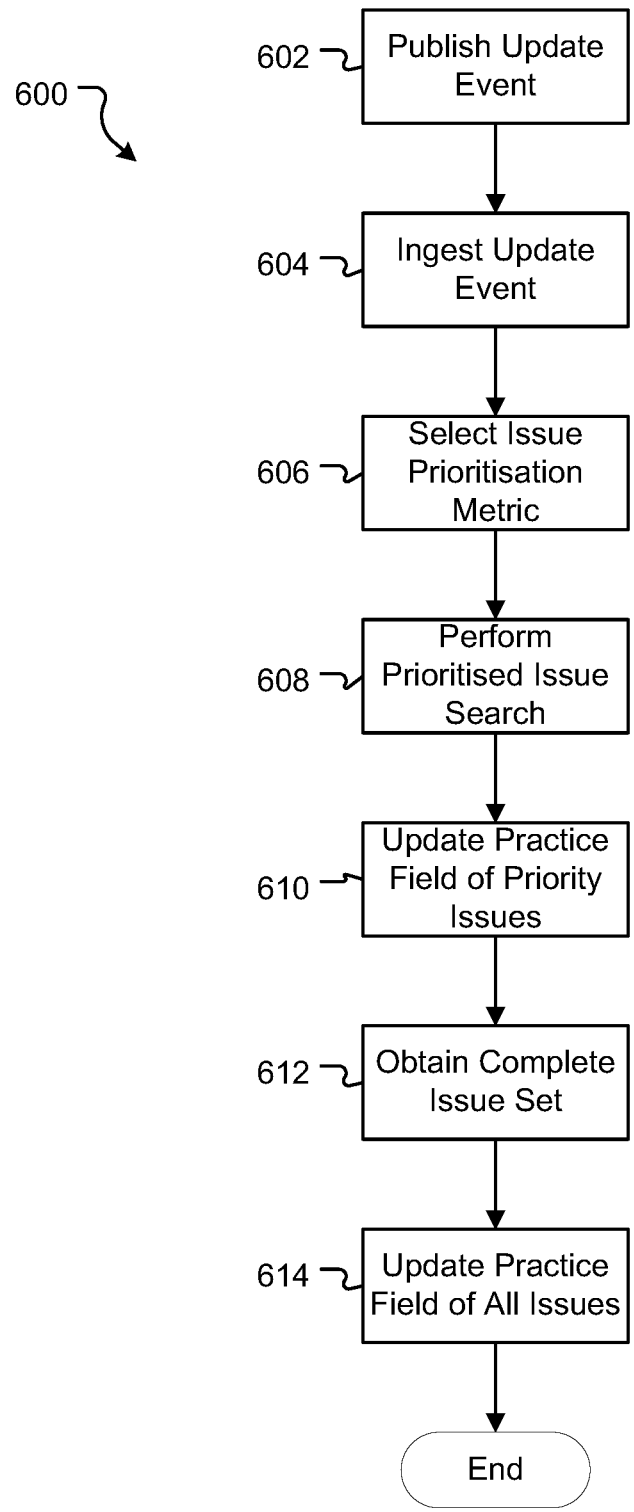
FIG. 6 is a flow diagram depicting a process for reassigning a Practice in accordance with the present disclosure.

One example of a process 600 performed by the ITSM Application 112 to reassign Practices at the request type level is illustrated by reference to FIG. 6. In the illustrated embodiment, process 600 is performed in a distributed manner by multiple nodes that comprise the ITSM Server System 110. The ITSM Application 112 typically establishes a messaging system, for example a publish-subscribe messaging system, for the purpose of performing process 600. The ITSM Application can utilise a longer running task to facilitate the update of requests' Practice Fields.

The process commences at step 602, at which the ITSM Application publishes an Update Event (such as a Request TypeUpdatedEvent or the like) to the ITSM Server System 110. The Update Event includes a Practice Identifier that indicates the value of the Practice Field to which requests will be updated.

At step 604, a Subscriber Node to the messaging system ingests the Update Event.

At step 606, the Subscriber Node executes programming (that can be communicated to the Subscriber Node in a message) to select an Issue Search Prioritisation Metric. A Prioritisation Metric allows the Subscriber Node to selectively filter the database of issues stored in the ITSM Data Store 118 and reduce the number of records to which processing is applied.

One example of a Prioritisation Metric is one that filters the ITSM Data Store 118 by reference to the issues that are more likely to be referenced by the ITSM Application 112. For example, a Prioritisation Metric can be used that filters out any closed issues from the ITSM Data Store 118. This then enables processing to be performed first on open issues. An alternative strategy involves prioritising a selected number of issues, and then performing processing on issues with particular characteristics (such as open issues).

At step 608, the Subscriber Node executes programming to perform a Prioritised Issue Search of the ITSM Data Store 118. In this regard, Prioritised Issue Search is a search that is conditioned by the selected Prioritisation Metric. Prioritised Issue Searches are typically submitted to the ITSM Data Store 118 as a suitably-constructed search query in the query language of the ITSM Data Store 118 (for example the JQL language).

The ITSM Data Store returns the results of the Prioritised Issue Search as a Result Set of priority issues. The result set can be ordered with a monotonically increasing value, such as the ID/key. This prevents reprocessing of requests in the event of a mechanism being used to scale the update, such as pagination by index. As an update operation may run over several minutes/hours, a stable ordering of the Result Set is preferred.

At step 610, the Subscriber Node executes programming to update the Practice Field of each issue in the Result Set. The Subscriber Node processes each issue in the Result Set in the defined order.

After the Practice Field of each priority issue has been updated, the Subscriber Node (at step 612) executes programming to obtain a list of all issues that have been created in the service desk project. The Subscriber Node can similarly order the complete set of issues with a monotonically increasing value such as the ID/key. Ordering the issue set in this way ensures that the end result of processing result is eventually consistent.

At step 614, the Subscriber Node executes programming to update the Practice Field of each issue in the complete set of issues. The Subscriber Node processes each issue in the defined order. The update assumes the operation to set the Practice Field is idempotent.

In the event that an issue's Practice reverts back to a previous Practice, the Subscriber Node restores the data for the Previous Practice.

Administrators can lock process 600 for a certain time period to serve as a rate limiting mechanism. This may be required if the Practice Field of completed issues is to be updated. In this way, the rate limiting mechanism allows an issue's Practice to be updated after any existing update backfill process is completed. The rate limiting mechanism reduces the potential for out-of-order event delivery.

A request type on an issue may become invalid in a number of scenarios, including:

The parent Issue Type is deleted or otherwise dissociated from the project;

The Request Type is deleted;

The issue is moved between projects;

The issue is moved to a different issue type.

The Practice is disabled within the project.

In these scenarios, the value of a Practice Field value may be rendered invalid. The Subscriber Node preferably does not directly modify an invalid Practice Field, as further processing may re-establish the correctness of the Practice Field value. However, the Subscriber Node may infer the value as "INVALID" or similar, and process the issue accordingly.

The value of the Issue Field is retained in a similar way for Practices that are disabled.

Computer Processing System

Various embodiments and features of the present disclosure are implemented using one or more computer processing systems.

Figure 7:
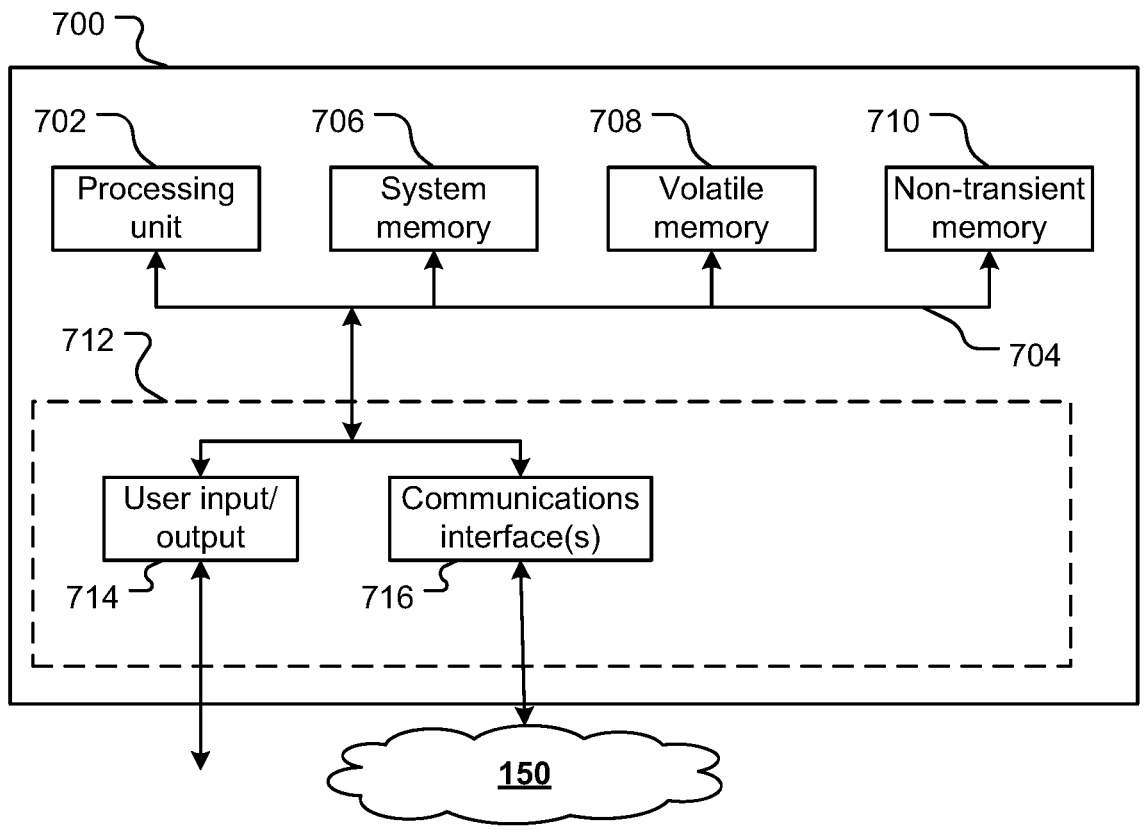
FIG. 7 is a block diagram of a computer processing system configurable to perform various features of the present disclosure.

FIG. 7 provides a block diagram of a computer processing system 700 configurable to implement embodiments and/or features described herein. System 700 is a general purpose computer processing system. It will be appreciated that FIG. 7 does not illustrate all functional or physical components of a computer processing system. For example, no power supply or power supply interface has been depicted, however system 700 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 700 includes at least one processing unit 702—for example a general or central processing unit, a graphics processing unit, or an alternative computational device). Computer processing system 700 may include a plurality of computer processing units. In some instances, where a computer processing system 700 is described as performing an operation or function all processing required to perform that operation or function will be performed by processing unit 702. In other instances, processing required to perform that operation or function may also be performed by remote processing devices accessible to and useable by (either in a shared or dedicated manner) system 700.

Through a communications bus 704, processing unit 702 is in data communication with a one or more computer readable storage devices which store instructions and/or data for controlling operation of the processing system 700. In this example system 700 includes a system memory 706 (e.g. a BIOS), volatile memory 708 (e.g. random access memory such as one or more DRAM modules), and non-volatile (or non-transitory) memory 710 (e.g. one or more hard disk or solid state drives). Such memory devices may also be referred to as computer readable storage media.

System 700 also includes one or more interfaces, indicated generally by 712, via which system 700 interfaces with various devices and/or networks. Generally speaking, other devices may be integral with system 700, or may be separate. Where a device is separate from system 700, connection between the device and system 700 may be via wired or wireless hardware and communication protocols, and may be a direct or an indirect (e.g. networked) connection.

Wired connection with other devices/networks may be by any appropriate standard or proprietary hardware and connectivity protocols, for example Universal Serial Bus (USB), eSATA, Thunderbolt, Ethernet, HDMI, and/or any other wired connection hardware/connectivity protocol.

Wireless connection with other devices/networks may similarly be by any appropriate standard or proprietary hardware and communications protocols, for example infrared, BlueTooth, WiFi; near field communications (NFC); Global System for Mobile Communications (GSM), Enhanced Data GSM Environment (EDGE), long term evolution (LTE), code division multiple access (CDMA—and/or variants thereof), and/or any other wireless hardware/connectivity protocol.

Generally speaking, and depending on the particular system in question, devices to which system 700 connects—whether by wired or wireless means—include one or more input/output devices (indicated generally by input/output device interface 214). Input devices are used to input data into system 700 for processing by the processing unit 702. Output devices allow data to be output by system 700. Example input/output devices are described below, however it will be appreciated that not all computer processing systems will include all mentioned devices, and that additional and alternative devices to those mentioned may well be used.

For example, system 700 may include or connect to one or more input devices by which information/data is input into (received by) system 700. Such input devices may include keyboards, mice, trackpads (and/or other touch/contact sensing devices, including touch screen displays), microphones, accelerometers, proximity sensors, GPS devices, touch sensors, and/or other input devices. System 700 may also include or connect to one or more output devices controlled by system 700 to output information. Such output devices may include devices such as displays (e.g. cathode ray tube displays, liquid crystal displays, light emitting diode displays, plasma displays, touch screen displays), speakers, vibration modules, light emitting diodes/other lights, and other output devices. System 700 may also include or connect to devices which may act as both input and output devices, for example memory devices/computer readable media (e.g. hard drives, solid state drives, disk drives, compact flash cards, SD cards, and other memory/computer readable media devices) which system 700 can read data from and/or write data to, and touch screen displays which can both display (output) data and receive touch signals (input).

System 700 also includes one or more communications interfaces 716 for communication with a network, such as network 150 of environment 100. Via a communications interface 216 system 200 can communicate data to and receive data from networked devices, which may themselves be other computer processing systems.

System 700 stores or has access to computer applications (also referred to as software or programs)—i.e. computer readable instructions and data which, when executed by the processing unit 702, configure system 700 to receive, process, and output data. Instructions and data can be stored on non-transitory computer readable medium accessible to system 700. For example, instructions and data may be stored on non-transitory memory 710. Instructions and data may be transmitted to/received by system 700 via a data signal in a transmission channel enabled (for example) by a wired or wireless network connection over interface such as 712.

Applications accessible to system 700 will typically include an operating system application such as Microsoft Windows®, Apple OSX, Apple IOS, Android, Unix, or Linux.

System 700 also stores or has access to applications which, when executed by the processing unit 702, configure system 700 to perform various computer-implemented processing operations described herein. For example, and referring to the networked environment of FIG. 1 above, Administrator System 130 and Agent System 140 each include an ITSM Client Application 132 and 142 which configures the respective System 130 and 140 to perform the described client system operations. ITSM Server System 110 includes an ITSM Application 112 which configures the ITSM Server System 110 to perform the described server system operations.

In some cases part or all of a given computer-implemented method will be performed by system 700 itself, while in other cases processing may be performed by other devices in data communication with system 700.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including", "includes", "comprising", "comprises", "comprised" and the like) are used inclusively and do not exclude further features, components, integers, steps, or elements.

Although the present disclosure uses terms "first," "second," etc. to describe various elements, these terms are used only to distinguish elements from one another and not in an ordinal sense.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A method for tailoring issue functionality in an information technology service management (ITSM) system, the method comprising:
causing display of a first graphical user interface of the ITSM system, the first graphical user interface including an issue view comprising a first set of graphical user interface elements displaying respective issue data for a selected issue of a set of issues assigned to a first practice, the first set of graphical user interface elements defined by a first practice value stored in a practice field of each issue of the set of issues;
causing display of a second graphical user interface including an administrator view of the ITSM system, the administrator view comprising a practice selection interface element;
in response to a user input to the practice selection interface element, causing the practice field for each issue of the set of issues to be automatically changed from the first practice value to a second practice value; and
subsequent to receiving the user input, causing display of the first graphical user interface of the ITSM system, the first graphical user interface including the issue view comprising a second set of graphical user interface elements displaying respective issue data for the selected issue of the set of issues assigned to the second practice, the second set of graphical user interface elements defined by the second practice value stored in the practice field of each issue of the set of issues, the second set of graphical user interface elements including at least one or more disabled elements that are automatically disabled in response to the user input causing the practice field to change from the first practice value to the second practice value.

2. The method of claim 1, wherein the second set of graphical user interface elements include one or more of a Services UI, Change Calendar, Deployment Change Management, Best-practice request type and Change-Management-specific automation rules.

3. The method of claim 1, further comprising:
in response to the change from the first practice value to the second practice value, locking a subset of values from a set of possible values from a first user interface element within the second set of graphical user interface elements, the locking including disabling a user from selection of the subset of values.

4. The method of claim 3, wherein the first user interface element is a change calendar and the subset of values are date ranges.

5. The method of claim 1, further comprising:
receiving a bulk action request with respect to a project managed by the ITSM system, the bulk action request including a practice assignment action;
executing a search on an ITSM data store using the project of the bulk action request;
receiving the set of issues from the ITSM data store in response to the search;
in response to the bulk action request, filtering the set of issues stored in the ITSM data store according to a prioritized issue search metric; and
modifying the practice field of each issue within the set of issues meeting the prioritized issue search metric to the practice value corresponding to the second practice.

6. The method of claim 1, wherein the prioritized issue search metric is associated with an issue status.

7. The method of claim 1, wherein practice comprises:
a first subset of features generated by an administrator; and
a second subset of features default to each practice from a set of candidate practice values.

8. The method of claim 1, wherein further comprising:
the changing from a first practice value to a second practice values comprises adding a set of navigation items to the first graphical user interface.

9. A method for tailoring issue functionality in an information technology service management (ITSM) system, the method comprising:

at an issue view of a first graphical user interface of the ITSM system, causing display of issue data corresponding to a first particular issue, the issue data comprising a first set of fields including a practice field, the practice field having a first practice value for the first particular issue, wherein:
  the first practice value determines a first set of graphical user interface elements displayed in the first graphical user interface, the first set of graphical user interface elements enabling a first set of features unique to the first practice value;
at an administrator view of a second graphical user interface of the ITSM system:
  causing display of a practice selection user interface element;
  assigning, by an administrator user, a second practice value to the first particular issue via the practice selection user interface element, the second practice value determining a second set of graphical user interface elements displayed in the first graphical user interface, the second set of graphical user interface elements enabling a second set of features unique to the second practice value, the second set of features different from the first set of features;
subsequent to assigning the second practice value to the first particular issue:
  modifying the first set of fields to a second set of fields, the second set of fields including the practice field, the second set of fields corresponding to the second practice value;
  at the issue view of the first graphical user interface of the ITSM system, cause display of the issue data of the first particular issue, the issue data displayed in accordance with the second practice value, wherein:
    the first set of graphical user interface elements are suppressed from the first graphical user interface; and
    for at least one user interface element of the second set of graphical user interface elements, automatically disabling a value of a set of possible values in accordance with a practice configuration criteria.

10. The method of claim 9, wherein:
the at least one user interface element corresponding to a change calendar; and
the value is a number of specific date fields outside a functioning parameter of the change calendar for the second practice value.

11. The method of claim 9, wherein the second set of features include one or more of a services user interface, change calendar, deployment change management, best-practice request type and change-management-specific automation rules.

12. The method of claim 9, wherein the practice value is associated with one of a Service Request Practice, an Incident Practice, a Problem Practice Change Management Practice, a Release Management Practice, and a Human Resources Practice.

13. The method of claim 9, further comprising:
receiving a bulk action request with respect to a project managed by the ITSM system, the bulk action request including a practice assignment action;
executing a search on an ITSM data store using the project of the bulk action request;
receiving a set of issues from the ITSM data store in response to the search;
in response to the bulk action request, filtering the set of issues stored in the ITSM data store according to a prioritized issue search metric; and
modifying the practice field of each issue within the set of issues meeting the prioritized issue search metric to the practice value corresponding to the second practice.

14. The method of claim 9, wherein the first practice value and the second practice value correspond to a first set of candidate practices, and further comprising:
in response to a request from an administrator to create a project, instantiating a project interface from a template;
in response to the instantiation of the project interface, loading at the ITSM system, a second set of candidate practice values, each practice value corresponding to one of a service request practice, an incident practice, a problem practice change management practice, a release management practice and a human resources practice; and
disabling, by the administrator, at least one practice from the second set of candidate practice values.

15. The method of claim 9, wherein the first set of fields includes at least one of a summary field, a reporter field, a component's field, an attachment field, a description field, a linked issues field, an assignee field, a priority field, and an impact field.

16. The method of claim 9, wherein modifying a first set of fields to a second set of fields includes hiding at least one field from the first set of fields from view.

* * * * *